Sept. 4, 1928.

O. WIEDERHOLD

RADIANT FOR HEATERS AND THE LIKE

Filed Nov. 10, 1927

1,683,375

WITNESS:

INVENTOR

Oscar Wiederhold
BY
Augustus B. Stoughton.
ATTORNEY

Patented Sept. 4, 1928.

1,683,375

UNITED STATES PATENT OFFICE.

OSCAR WIEDERHOLD, OF PHILADELPHIA, PENNSYLVANIA.

RADIANT FOR HEATERS AND THE LIKE.

Application filed November 10, 1927. Serial No. 232,247.

The principal objects of the present invention are, first, to improve the appearance of glowing refractory radiants by imparting to them an incandescent starlike effect; second, to cause the glowing radiants to emit desirable light rays, for example, red but more particularly, ultra violet rays which possess desirable properties in respect to the surrounding atmosphere; and third, to cause the glowing radiants to give off more sensible heat.

To these and other ends hereinafter set forth the invention, generally stated, may be said to comprise a ceramic radiant having projections including a porous oxide incandescent at comparatively low temperatures.

The invention also comprises the improvements to be presently described and finally claimed.

In the description reference will be made to the accompanying drawing illustrating one type of radiant chosen from among many types of radiants for the sake of illustrating and having my invention applied thereto.

Referring to the drawing

Figures 1, 2, 3:
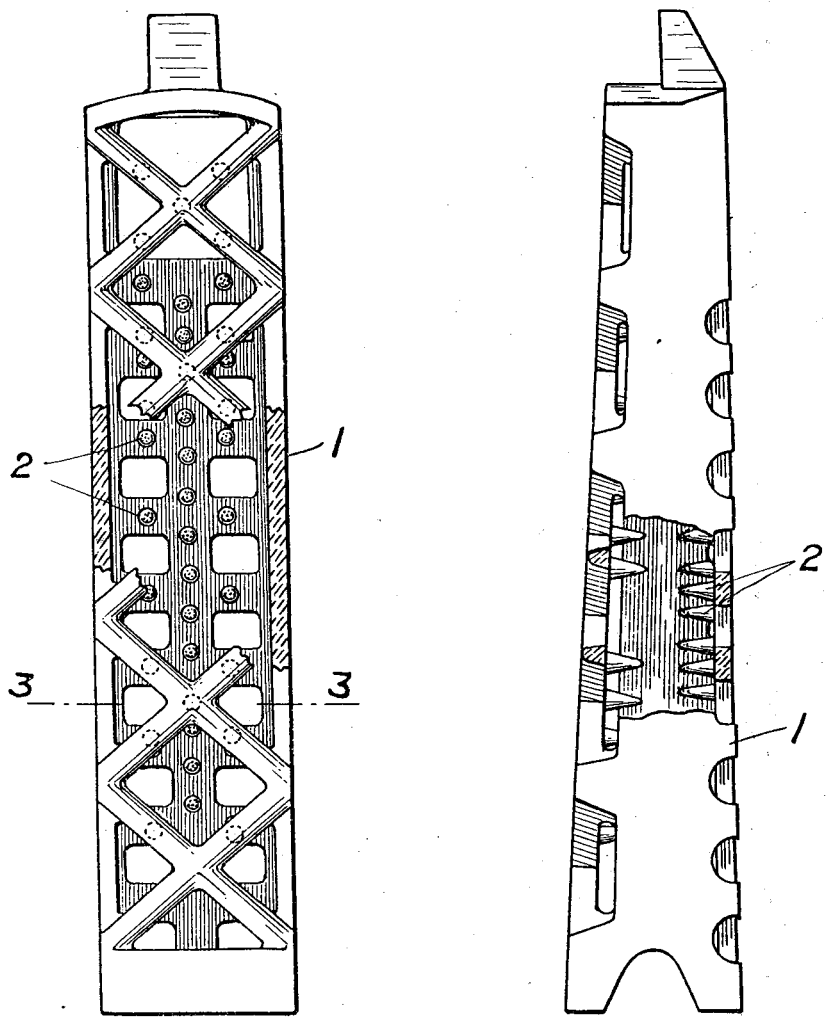
Figure 1 is a front view with parts broken away.
Fig. 2 is a side view with parts broken away.
Fig. 3 is a section on the line 3—3 of Fig. 1.

Having reference to the drawing 1 is a ceramic radiant consisting of refractory material and adapted for use with gas heaters, stoves and the like, or perhaps more accurately, with the burners thereof. The radiant 1 has embodied in its construction projections. As shown the projections are in the form of cones 2, but they are frequently of the form of ribs, fins or other small masses as is well known. These projections by reason of their comparatively small mass become relatively highly heated in respect to the other portions of the radiant. The projections, whatever their form, include an oxide incandescent at the temperature which they attain and which temperature is a comparatively low one at which to produce incandescence. The incandescence produced on and at the projections in contrast with the glow of the heated radiant produces the effect of brilliant little stars and gives to the radiant an attractive appearance.

An example of an oxide incandescent at comparatively low temperatures is an admixture of thorium oxide and cerium oxide and uranium oxide. These of course are typical of oxides of rare earth metals and when employed in combination may well be proportioned as 1 to 3% each of cerium oxide and uranium oxide in respect to thorium oxide. One function of the uranium oxide is to give off red rays, ultra violet rays and perhaps other advantageous rays. One function of the cerium oxide is to give off increased sensible heat and the function of the combination is, by incandescence, to produce powerful light in the form of spots resembling powerful little stars. As another example of an oxide, incandescent to a lesser degree at comparatively low temperature, mention may be made of oxide of calcium.

To produce red rays, ultra violet rays and other advantageous rays an exciter such as thorium oxide which does not contract after long exposure to a Bunsen flame is preferable and it should contain about 1% of an oxide of a metal when incandescent, of which the following alone or in combination are examples: uranium, iron, copper, glucium, tungsten, strontium, and magnesium.

It will be obvious to those skilled in the art that modifications may be made in matters of mere form and in the employment of chemical equivalents without departing from the spirit of the invention.

I claim:

1. A radiant of ceramic material having projections thereon, said projections including a porous oxide incandescent at comparatively low temperatures.

2. A radiant of ceramic material including a metallic body adapted to emit ultra violet rays at the temperature at which the radiant is normally employed.

3. A radiant for an open gas heater, made of refractory material, having projections on the interior of the back wall thereof, said projections comprising as a part thereof porous oxides which when heated emit from the surface of the projections the heat energy received in the form of ultra violet rays.

4. A radiant for an open gas heater, made of refractory material, having projections on the interior of the back wall thereof, said projections comprising as a part thereof porous oxides which when heated, emit from the surface of the projections the heat energy received in the form of rays of therapeutic value.

OSCAR WIEDERHOLD.